United States Patent
Bedal et al.

[11] Patent Number: 6,136,252
[45] Date of Patent: Oct. 24, 2000

[54] APPARATUS FOR ELECTRO-CHEMICAL DEPOSITION WITH THERMAL ANNEAL CHAMBER

[75] Inventors: Bryan J. L. Bedal, Santa Clarita; Thomas A. Kerekes, Calabasas; Joe M. Brown, Valencia, all of Calif.

[73] Assignee: 3D Systems, Inc., Valencia, Calif.

[21] Appl. No.: 09/257,853

[22] Filed: Feb. 25, 1999

[51] Int. Cl.[7] .................................................. B29C 41/02
[52] U.S. Cl. ........................... 264/308; 347/1; 425/140; 425/145; 425/150; 700/119
[58] Field of Search .................... 264/40.4, 308, 264/401; 425/140, 145, 150, 174.4; 347/1; 700/119

[56] References Cited

U.S. PATENT DOCUMENTS

| | | | |
|---|---|---|---|
| 5,902,537 | 5/1999 | Almquist et al. | 264/401 |
| 5,943,235 | 8/1999 | Earl et al. | 700/98 |

*Primary Examiner*—Leo B. Tentoni
*Attorney, Agent, or Firm*—Ralph D'Alessandro

[57] ABSTRACT

Techniques for printing raster lines in a selective deposition modeling (SDM) system. Raster lines may be printed using different numbers of jets in each group in different passes. Moreover, full and partial head randomization is available. Selected raster lines are printed in one direction, although the print head prints in two directions. Furthermore, raster lines printing may be interlaced, and deposition order may be changed between layers.

30 Claims, 5 Drawing Sheets

APPARATUS FOR ELECTRO-CHEMICAL DEPOSITION WITH THERMAL ANNEAL CHAMBER

RELATED APPLICATION

This application is related to U.S. patent application Ser. No. 08/722,335, filed Sep. 27, 1996, entitled "SELECTIVE DEPOSITION MODELING METHOD AND APPARATUS FOR FORMING THREE-DIMENSIONAL OBJECTS AND SUPPORTS", which is now abandoned.

FIELD OF THE INVENTION

This invention relates to techniques for a control system in a selective deposition modeling system used for forming three-dimensional (3D) objects on substantially a layer-by-layer basis with enhanced resolution. The invention more particularly relates to techniques for printing raster lines in a selective deposition modeling system.

BACKGROUND INFORMATION

Rapid Prototyping and Manufacturing (RP&M) is the name given to a field of technologies that can be used to form three-dimensional objects rapidly and automatically from three-dimensional computer data representing the objects. RP&M can be considered to include three classes of technologies: (1) Stereolithography, (2) Laminated Object Manufacturing, and (3) Selective Deposition Modeling.

The stereolithography class of technologies create three-dimensional objects based on the successive formation of layers of a fluid-like medium adjacent to previously formed layers of medium and the selective solidification of those layers according to cross-sectional data representing successive slices of the three-dimensional object in order to form and adhere laminae. One technology is known simply as stereolithography and uses a liquid medium which is selectively solidified by exposing it to prescribed stimulation. The liquid medium is typically a photopolymer and the prescribed stimulation is typically visible or ultraviolet electromagnetic radiation. Liquid-based stereolithography is disclosed in various patents, applications, and publications of which a number are briefly described in the Related Applications section hereinafter. Another stereolithography technology is known as Selective Laser Sintering (SLS). SLS is based on the selective solidification of layers of a powdered medium by exposing the layers to infrared electromagnetic radiation to sinter or fuse the particles. SLS is described in U.S. Pat. No. 4,863,538 issued Sep. 5, 1989 to Deckard. A third technology is known as Three-dimensional Printing (3DP). 3DP is based on the selective solidification of layers of a powdered medium which are solidified by the selective deposition of a binder thereon. 3DP is described in U.S. Pat. No. 5,204,055 issued Apr. 20, 1993 to Sachs.

Laminated Object Manufacturing, LOM, techniques involve the formation of three-dimensional objects by the stacking, adhering, and selective cutting of sheets of material, in a selected order, according to the cross-sectional data representing the three-dimensional object to be formed. LOM is described in U.S. Pat. No. 4,752,352 issued Jun. 21, 1988 to Feygin; and U.S Pat. No. 5,015,312 issued May 14, 1991 to Kinzie, and in PCT Publication No. WO 95-18009 issued Jul. 6, 1995 to Morita.

Selective Deposition Modeling, SDM, involves the build-up of three-dimensional objects by selectively depositing solidifiable material on a lamina-by-lamina basis according to cross-sectional data representing slices of the three-dimensional object. One such technique is called Fused Deposition Modeling, FDM, and involves the extrusion of streams of heated, flowable material which solidify as they are dispensed onto the previously formed laminae of the object. FDM is described in U.S. Pat. No. 5,121,329 issued Jun. 9, 1992 to Crump. Another technique is called Ballistic Particle Manufacturing, BPM, which uses a 5-axis, ink-jet dispenser to direct particles of a material onto previously solidified layers of the object. BPM is described in PCT publication numbers WO 96-12607 issued May 2, 1996 to Brown; WO 96-12608 issued May 2, 1996 to Brown; WO 96-12609 issued May 2, 1996 to Menhennett; and WO 96-12610 issued May 2, 1996 to Menhennett, all assigned to BPM Technology, Inc. A third technique is called Multijet Modeling, MJM, and involves the selective deposition of droplets of material from multiple ink jet orifices to speed the building process. MultiMate Modeling is described in PCT Publication Nos. WO 97-11835 issued Apr. 3, 1997 to Leyden et al. and WO 97-11837 issued Apr. 3, 1997 to Earl et al. (both assigned to 3D Systems, Inc. as is the instant application). A fourth example is Thermal Stereolithography (TSL) as described in U.S. Pat. No. 5,141,680 issued Aug. 25, 1992 to Almquist, et al.

When using SDM (as well as other RP&M building techniques), the appropriateness of various methods and apparatus for production of useful objects depends on a number of factors. As these factors cannot typically be optimized simultaneously, a selection of an appropriate building technique and associated method and apparatus involve trade-offs depending on specific needs and circumstances. Some factors to be considered may include 1) equipment cost, 2) operation cost, 3) production speed, 4) object accuracy, 5) object surface finish, 6) material properties of formed objects, 7) anticipated use of objects, 8) availability of secondary processes for obtaining different material properties, 9) ease of use and operator constraints, 10) required or desired operation environment, 11) safety, and 12) post processing time and effort.

In this regard there has been a long existing need to simultaneously optimize as many of these parameters as possible to more effectively build three-dimensional objects. As a first example, there has been a need to enhance object production speed and lower set up time and file preparation time when building objects using a Selective Deposition Modeling technique (SDM) while simultaneously maintaining or reducing the equipment cost. A critical problem in this regard has been the need for an efficient technique for printing raster lines for three-dimensional objects using different numbers of jets.

Accordingly, there is a long-felt but unmet need for methods and apparatus to print raster lines in a Selective Deposition Modeling system to overcome the disadvantages of the prior art.

Though, as noted above, the techniques of the instant invention are directed primarily to selective deposition modeling object formation, it is believed that the techniques may have application in other RP&M technologies.

All patents referred to in this section of the specification are hereby incorporated by reference as if set forth in full.

SUMMARY OF THE DISCLOSURE

Embodiments of the instant invention involve a number of techniques (including methods and apparatus) that can be used alone or in combination to address a number of problems associated with controlling jobs for forming 3D objects by Selective Deposition Modeling. Though primarily directed to Selective Deposition Modeling techniques, the techniques described hereinafter can be applied in a variety of ways to the other RP&M technologies as described above to enhance system throughput by providing enhanced object generation techniques. Furthermore, the techniques described herein can be applied to Selective Deposition Modeling systems that use one or more building and/or support materials wherein one or more of the materials are selectively dispensed, wherein others may be dispensed non-selectively, and wherein elevated temperatures may or may not be used for all or part of the materials to aid in their selectively deposition.

The techniques can be applied to Selective Deposition Modeling systems wherein the building material is a solid at ambient made to be melted, which material can be made to solidify after dispensing by causing the removal of the solvent (e.g., by heating the dispensed material, by dispensing the material into a partially evacuated (i.e., vacuum) building chamber, or by simply allowing sufficient time for the solvent to evaporate). Furthermore, various dispensing techniques may be used such as dispensing by single or multiple ink jet devices including hot melt ink jets, bubble jets, etc. and continuous or semi-continuous flow, single or multiple orifice extrusion nozzles or heads.

A first embodiment of the invention involves methods and apparatus for printing raster lines using different numbers of jets in each group in different passes.

A second embodiment of the invention involves methods and apparatus for providing full and partial head randomization.

A third embodiment of the invention involves methods and apparatus for providing printing of selected raster lines in one direction, although the print head prints in two directions.

A fourth embodiment of the invention involves methods and apparatus for interlacing raster line deposition and changing deposition order between layers.

It is intended that the above embodiments can be achieved separately by different aspects of the invention and that additional embodiments of the invention will involve various combinations of the above independent embodiments such that synergistic benefits may be obtained from combined techniques.

Other aspects of the invention will be apparent from the description herein.

DESCRIPTION OF THE INVENTION

As previously discussed, the subject application is directed to techniques for printing raster lines in a Selective Deposition Modeling system. The detailed description of the invention will begin with a description of a preferred Selective Deposition Modeling system wherein embodiment details will be described as appropriate.

Figure 1:
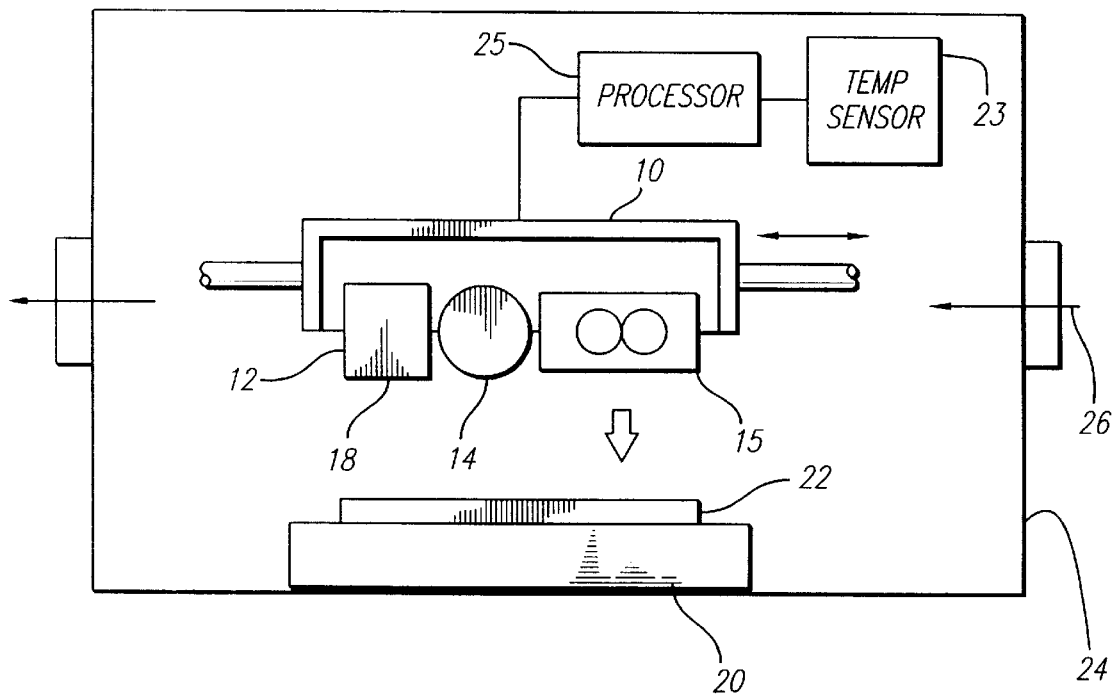
FIG. 1 illustrates a preferred apparatus for performing Selective Deposition Modeling.
Figure 2:
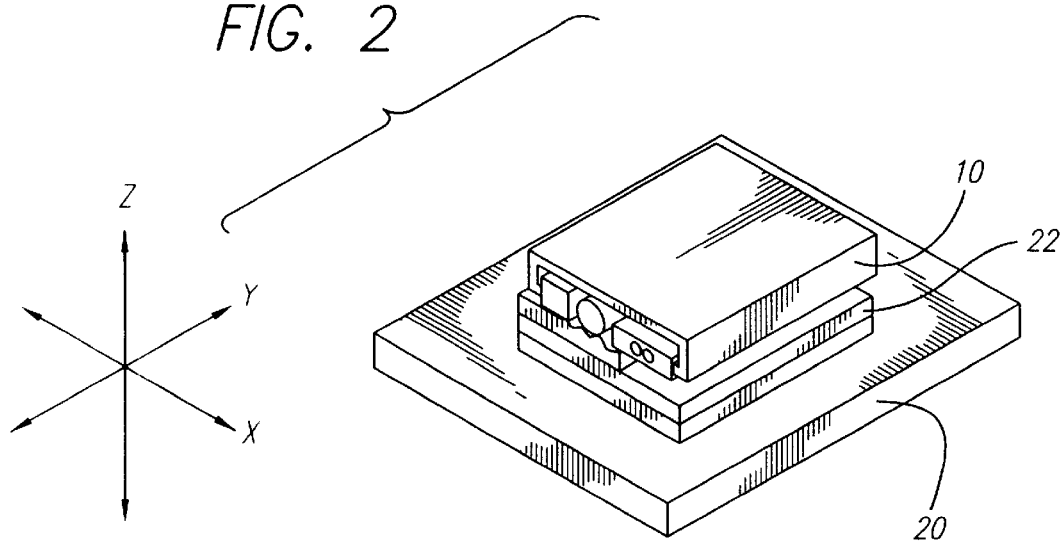
FIG. 2 illustrates another view of a build platform.

A preferred apparatus for performing Selective Deposition Modeling is illustrated in FIGS. 1 and 2. The apparatus comprises a dispensing carriage 10 on which is situated dispensing head 12 (e.g., multi-orifice ink jet head) and planarizer (e.g., a rotating and/or heated roller) 14. The dispensing carriage 10 is supported and drivable back and forth in the X-direction, also known as the main scanning direction, adjacent a build platform 20. The spacing between the head 12 and the dispensing carriage 10 in FIG. 1 is exaggerated for simplifying the present disclosure. In practice the spacing would be small enough to allow the planarizer 14 to contact material deposited on the build platform by the head 12. The motion of the dispensing carriage 10 is under the control of a suitable drive motor and a control computer or microprocessor (not shown).

Furthermore, at either side of the dispensing carriage 10 and/or between the planarizer 14 and dispensing head 12, one or more fans 15 for blowing air vertically down are mounted to help cool the dispensed material and substrate such that the desired building temperature is maintained. Of course other mounting schemes for the fans and/or other cooling systems are possible including the use of misting devices for directing vaporizable liquids (e.g., water, alcohol, or solvents) onto the surface of the object. Cooling systems might involve active or passive techniques for removing heat and may be computer controlled in combination with temperature sensing devices to maintain the dispensed material within the desired building temperature range.

The dispensing head (also referred to as a print head or dispenser) 12 may be for example, a commercial print head configured for jetting color hot melt inks (e.g., thermal plastics or wax-like materials), and modified and/or controlled for use in a three-dimensional modeling system wherein the print head undergoes back and forth movements and accelerations. In one embodiment, the head is a 352 jet multi-color commercial print head produced by Tektronix Corporation. One group of jets comprises four jets 16 which, in a color print head, would represent four colors. Three jets are on the same X-line, and one jet at the end of the sequence of four jets is positioned slightly off of this X-line (i.e., on a different Y-dimension location from the other three jets).

The print head is supplied hot melt material in a flowable state from a reservoir (not shown) for selective jetting from the print head. In a preferred implementation, all 352 jets on the print head are computer controlled to selectively fire droplets when each orifice (i.e., jet) is appropriately located to dispense droplets onto desired locations of a build platform 20. In practice, commands are sent to each jet selectively commanding each one to fire (i.e., dispense a droplet) or not to fire (i.e., not to dispense a droplet) depending on jet position and desired locations for material deposition. Also, in practice, firing commands are preferably sent simultaneously to all jets. Thus, in a preferred situation, the head is computer controlled so as to selectively fire the jets, to simultaneously emit droplets of the molten material through one or more jets. Of course it will be appreciated that in alternative embodiments, heads with a different numbers of jets can be used, different firing frequencies are possible and, in appropriate circumstances, non-simultaneous firing of the jets is possible.

The print head defines a pattern of orifices corresponding in number to the number of jets. With respect to FIG. 1, the orifices are directed such that droplets of material are allowed to emit from the underside of the dispensing carriage 10. In a preferred embodiment, the dispensing head 12 (i.e., the array of orifices) is mounted at an angle to the main scanning direction (e.g., X-direction) and is configured with the N=352 individually controllable orifices, arranged in 88 groups of four jets.

Each dispenser (e.g., jet) is equipped with a piezoelectric element which causes a pressure wave to propagate through the material when an electric firing pulse is applied to the element in accordance with well known ink jet head technology. The pressure wave causes a drop of material to be emitted from orifice. The 352 dispensers are controlled by the control computer which controls the rate and timing of the firing pulses applied to the individual dispenser and therefore the rate and timing of droplets being emitted from the orifices.

One preferred embodiment uses raster scanning to position the print head and orifices to dispense material at desired drop locations. The printing process for each layer is accomplished by a series of relative movements between the head and the desired drop locations on the build platform or previously formed layer. Printing typically occurs as the head relatively moves in a main scanning direction. This is followed by a movement of the build platform 20 in a secondary scanning direction (i.e., Y-direction), while no dispensing occurs. Next, the dispensing carriage 10 moves in a reverse main scanning direction (i.e., opposite X-direction from the direction of movement while dispensing in the previous pass), while dispensing occurs. This is followed by another scan in the main scanning direction in which dispensing again occurs. Alternatively, dispensing may occur in only one X-direction. This process occurs repeatedly until the layer is completely deposited. The procedure is then repeated for each subsequent layer.

Other alternative embodiments may utilize vector scanning techniques or a combination of vector scanning and raster scanning. Other alternative embodiments may use substantially non-perpendicular main and secondary scanning directions along with techniques that result in proper placement of droplets.

In other alternative embodiments multiple prints heads may be used which lay end to end (extend in the secondary scanning direction) and/or which are stacked back to back (stacked in the main scanning direction). When stacked back to back the print heads may have orifices aligned in the main scanning direction so that they print over the same lines or alternatively they may be offset from one another so as dispense material along different main scanning lines. In particular, it may be desirable to have the back to back print heads offset from each other in the secondary scanning direction by the desired raster line spacing to minimize the number of main scanning passes that must occur. In other alternative embodiments the data defining deposition locations may not be located by pixels defining a rectangular grid but instead may be located by pixels laid out in some other pattern (e.g., offset or staggered pattern). More particularly, the deposition locations may be fully or partially varied from layer to layer in order to perform partial pixel drop location offsetting for an entire layer or for a portion of a layer based on the particulars of a region to be jetted.

With reference to FIG. 1, planarizer 14 comprises a heated rotating cylinder with a smooth surface. Its function is to melt, transfer and remove portions of the most recently dispensed layer of material, to smooth it out, to set a desired thickness for the last formed layer, and to set the net upper surface of the last formed layer to a desired level (i.e., the desired working surface or working level for forming a next lamina of the object). Numeral 22 identifies a layer of material which has just been deposited by the print head. The rotating cylinder planarizer 14 is mounted to the dispensing carriage 10 such that it is allowed to project from the underside of the platform by a sufficient amount in the Z-direction such that it contacts material 22 on build platform 20 at a desired level below the orifice plate (the spacing between the planarizer 14 and material 22 is exaggerated in FIG. 1, to more clearly show elements of the system).

The rotation of the planarizer cylinder sweeps material from the just-deposited layer, leaving a smooth surface. The just-deposited material adheres to the smooth, heated surface of the cylinder and is displaced until it contacts a wiper (not shown). The wiper is disposed to effectively "scrape" the material from the surface of the cylinder. This material, which is still flowable, is either disposed of or recycled.

With reference to FIG. 1, build platform 20 defines a surface on which is built the three-dimensional object or part layer-by-layer. This platform 20 is preferably supported for movement and driven back and forth in the Y-direction (i.e., index direction or secondary scanning direction) under computer control. The build platform 20 also is supported for movement and is driven up and down (typically progressively downward during the build process) in the Z-direction under computer control.

To build a cross-section of a part, the build platform 20 moves in the Z-direction relative to the print head, such that the last-built (i.e., dispensed and possibly planed) layer of the part is situated an appropriate amount below the orifice plate 18 of the print head. The print head is moved one or more times over the XY build region (the head sweeps back and forth in the X-direction, while the Y-stage translates the partially formed object in the Y-direction). The combination of the last formed layer of the object and any supports associated therewith define the working surface for deposition of the next lamina and any supports associated therewith. During translation in the XY directions, the jets of the print head are fired in a registered manner with previously dispensed layers to deposit material in a desired pattern and sequence for the building of the next lamina of the object. During the dispensing process, a portion of the dispensed material is removed by the planarizer in the manner discussed above. The X, Y and Z movements, dispensing, and planarizing are repeated to build up the object from a plurality of selectively dispensed and adhered layers. In an alternative embodiment the step of planarization could be performed independently of the dispensing steps. In other alternative embodiments the planarizer may not be used on all layers but instead may be used on selected or periodic layers.

As noted previously, in a preferred embodiment, the print head is directed to trace a raster pattern. The raster pattern consists of a series of raster lines, R(1), R(2), . . . , R(N), running in the X-direction or main scanning direction and arrayed along the Y-direction (i.e., index direction or secondary scanning direction). The raster lines are spaced from one another by a distance $d_r$, which, in a preferred embodiment, is 1/300 inches (about 3.3 mils or about 83.8 $\mu$m).

This is accomplished by following a two-step process. The first step includes alternating main scanning direction passes with secondary scanning direction movements of an amount equal to the desired raster line resolution until all raster lines between initial lines dispensed by two adjacent jets are scanned. Thereafter, a second step includes a large index direction increment is made. The first and second steps are repeated until the indexing direction increments, and lines scanned, are sufficient to deposit material on all raster lines required to form the object layer or cross-section (including any necessary supports for forming subsequent cross-sections).

The firing of the ink jet orifices is controlled by a rectangular bit map maintained in a control computer or other memory device. The bit map consists of a grid of memory cells, in which each memory cell corresponds to a pixel of the working surface, and in which the rows of the grid extend in the main scanning direction (X-direction) and the columns of the grid extend in the secondary scanning direction (Y-direction). The width of (or distance between) the rows (spacing along the Y-direction) may be different from the width (or length of or distance between ) of the columns (spacing along the X-direction) dictating that different data resolutions may exist along the X and Y directions. In alternative embodiments, non-uniform pixel size is possible within a layer or between layers wherein one or both of the pixel width or length is varied by pixel position. In other alternatives, other pixel alignment patterns are possible. For example, pixels on adjacent rows may be offset in the main scanning direction by a fractional amount of the spacing between pixels in the main scanning direction so that their center points do not align with the center points of the pixels in the neighboring rows. This fractional amount may be ½ so that their center points are aligned with the pixel boundaries of adjacent rows. It may be ⅓ or some other amount such that two or more intermediate rows of pixels are located between rows where pixels are realigned in the main scanning direction. In further alternatives, pixel alignment might be dependent on the geometry of the object or support structure being dispensed. For example, it might be desirable to shift pixel alignment when forming a portion of a support pattern that is supposed to bridge a gap between support columns. These and other alternative pixel alignment schemes can be implemented by modifying the pixel configuration or alternatively defining a higher resolution pixel arrangement (in X and/or Y) and using pixel firing patterns that do not fire on every pixel location but instead fire on selected spaced pixel locations which may vary according to a desired random, predetermined or object basis pattern.

The data resolution in the main scanning direction may be defined in terms of Main Direction Pixels (MDPs). MDPs may be described in terms of pixel length or in terms of number of pixels per unit length. In a preferred embodiment MDP=300 pixels per inch (3.3 mils/pixel or 83.8 $\mu$m/pixel). In other preferred embodiments MDP=1200 pixels per inch. Similarly the data resolution in the secondary scanning direction may be defined in terms of Secondary Direction Pixels (SDPs) and the SDPs may be described in terms of pixel width or in terms of number of pixels per unit length. In a preferred embodiment SDP=MDP=300 pixels per inch (3.3 mils/pixel or 83.8 $\mu$m/pixel). The SDP may or may not be equivalent to spacing between raster lines and the MDP may or may not be equivalent to the spacing between successive drop locations along each raster line. The spacing between successive raster lines may be defined as Secondary Drop Locations (SDLs), while spacing between successive drop locations along each raster line may be defined as Main Drop Locations (MDLs). Similar to SDPs and MDPs, SDLs and MDLs may be defined in terms of drops per unit length or drop spacing.

If SDP=SDL there is a one to one correspondence between data and drop locations along the secondary scanning direction and the pixel spacing is equal to that of the raster line spacing. If MDP=MDL there is a one to one correspondence between data and drop locations along the main scanning direction.

If SDL and/or MDL is larger than SDP and MDP, respectively, more drops will need to be fired than that for which data exists, thus each pixel will need to be used in causing more than one droplet to be dispensed. The dispensing of these extra droplets can be done in one of two ways either by dispensing the droplets at intermediate points between the centers of successive pixels (i.e., intermediate dropping, "ID") or alternatively directly on top of pixel centers (i.e., direct dropping, "DD"). In either case this technique is called "overprinting" and results in faster build up of material and eases mechanical design constraints involving maximum scan speeds and acceleration rates since the same Z-build up can occur while moving the print head and/or object more slowly.

If SDL and/or MDL is less than SDP and/or MDP, respectfully, drops will be fired at fewer locations than those for which data exists, at least for a given pass of the print head. This data situation may be used to implement the offset pixel and/or non-uniform sized pixel techniques discussed above.

To build a cross-section, the bit map is first loaded with data representative of the desired cross-section (as well as any supports which are desired to be built). Assuming, as with the preferred embodiment, a single build and support material is being used, if it is desired to deposit material at a given pixel location, then the memory cell corresponding to that location is appropriately flagged (e.g., loaded with a binary "1") and if no material is to be deposited an opposite flag is used (e.g., a binary "0"). If multiple materials are used, cells corresponding to deposition sites are flagged appropriately to indicate not only drop location sites but also the material type to be deposited. For ease of data handling, compressed data defining an object or support region (e.g., on-off location points along each raster line) can be booleaned with a fill pattern description to be used for the particular region to derive a final bit map representation used for firing the dispensing jets. The raster lines making up the grid are then assigned to individual orifices in the manner described earlier. Then, a particular orifice is directed to fire or not over a pixel depending on how the corresponding cell in the bit map is flagged.

Firing Different Numbers of Jets in a Group

The preferred embodiment of the invention enables use of a different number of jets in each group of jets during two passes. A pass is a movement of the print head in one direction while the jets on the print head are aligned with corresponding raster line positions. The print head moves in the X-direction, with one pass being in the positive X-direction (for example, left to right) and the other pass being in the negative X-direction (for example, right to left). Each time the print head moves in one pass, one or more jets may be fired to dispense material on one or more corresponding raster lines. However, according to a preferred embodiment, each raster line in multiple sequentially formed layers is dispensed while the head moves in one (common) direction. For example, raster line (1) in each layer is always printed only when the print head is moving "left to right", and raster line (3) in each layer is printed only when the print head is moving to "right to left". Moreover, after each pass, the print head is shifted in the Y-direction to align the jets with further raster line positions in preparation of another pass. No printing occurs during the shift in the Y-direction. In one embodiment of the invention, the raster lines can be skipped, for example, using movement in the Y-direction.

Figure 3:
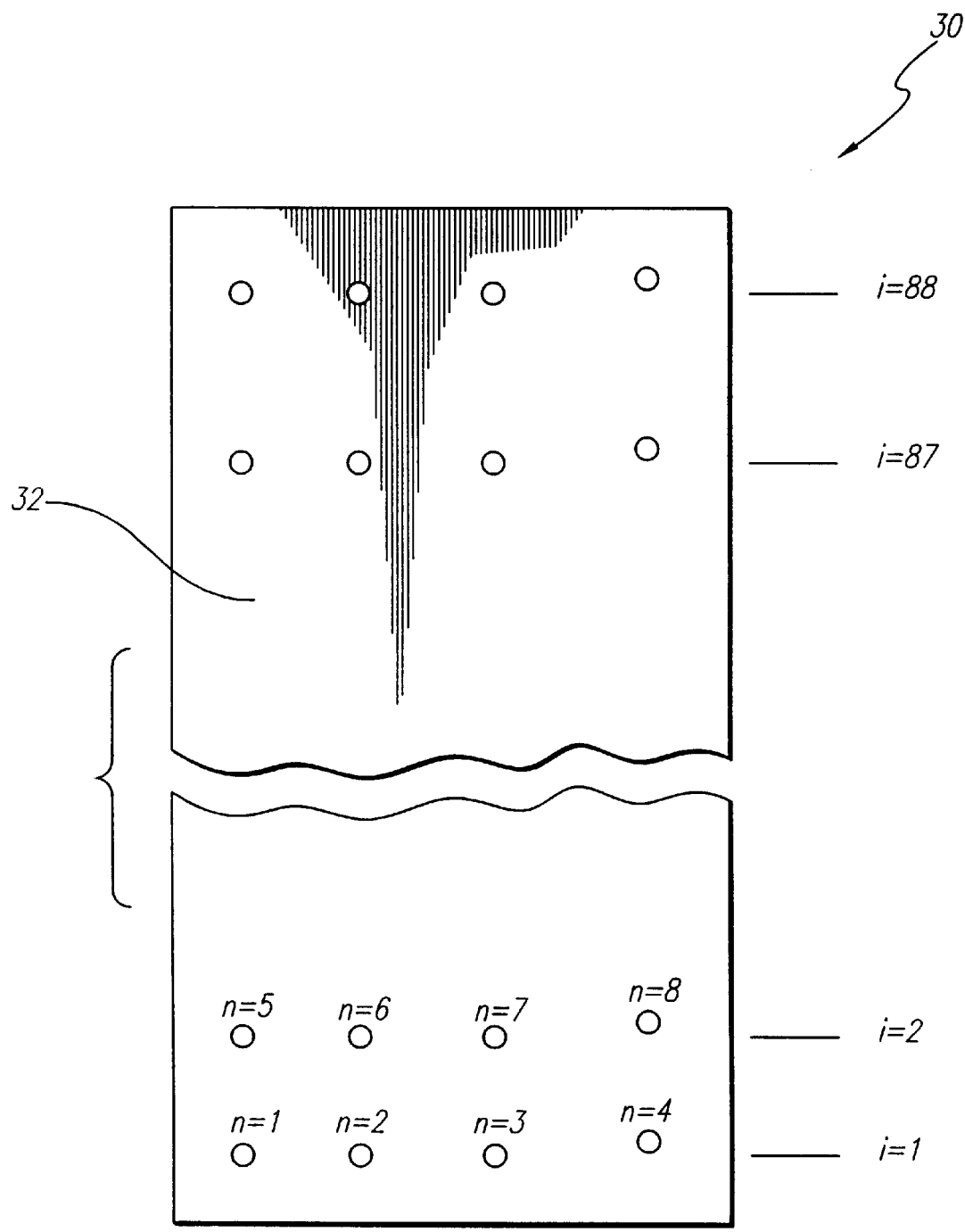
FIG. 3 illustrates a bottom view of the print head, with the 352 jets being in 88 groups of four jets.

FIG. 3 illustrates a bottom view of the print head, with the 352 jets being in 88 groups of four jets. The jets (represented by numeral 32) are numbered n=1 . . . 352, and the groups (represented by numeral 30) are numbered i=1 . . . 88, as illustrated in FIG. 3. For example, group 1 has four jets number 1, 2, 3, and 4, and group 2 has four jets numbered 5, 6, 7, and 8. While preferred embodiments described herein employ a print head having 352 jets arranged in the above-described 88 groups of four, it will be understood that further embodiments may employ a print head configuration having a different total number of jets or a different jet group arrangement.

Figure 4:
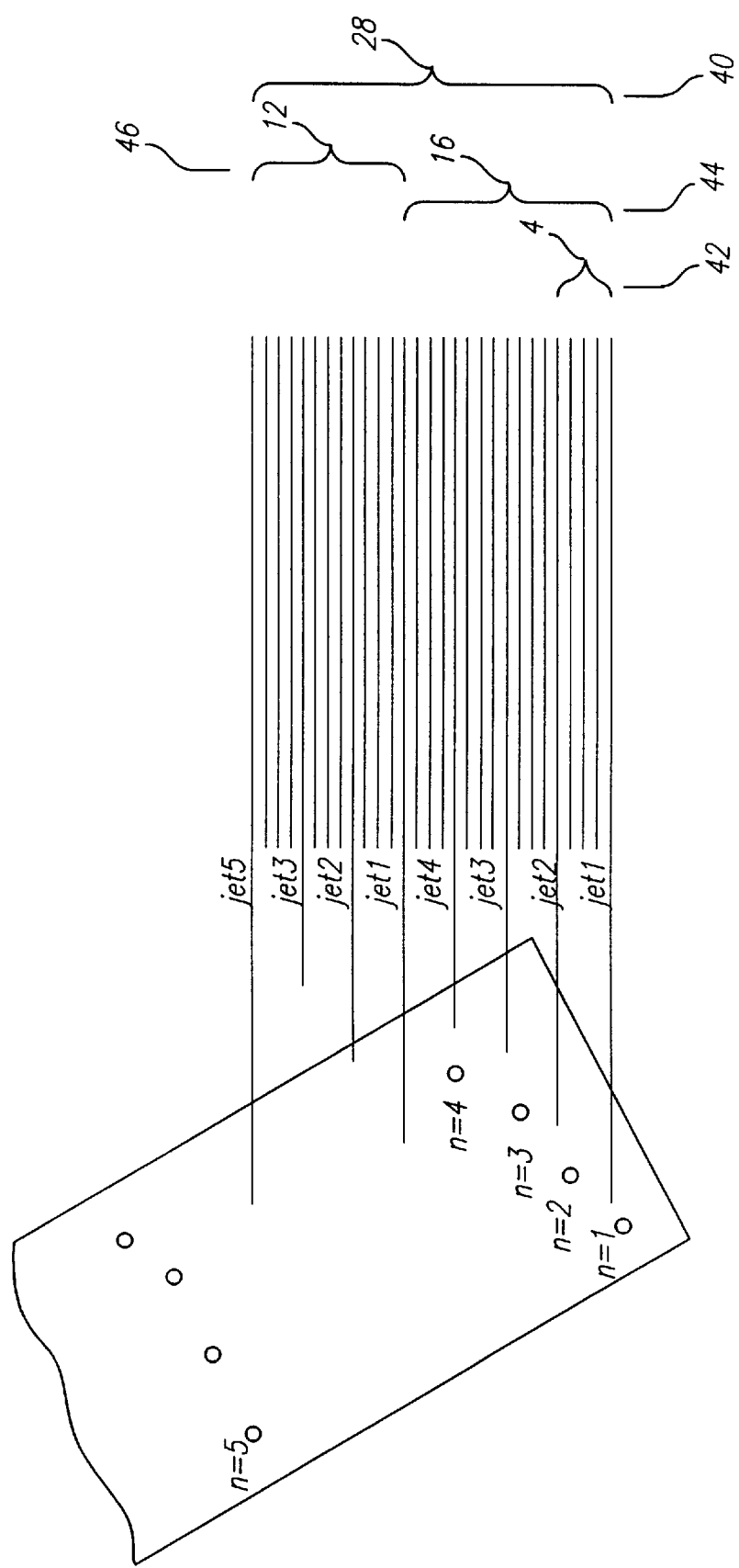
FIG. 4 illustrates the jets of the print head and used to print various raster lines.

FIG. 4 illustrates the jets of the print head 32 used to dispense material on various raster lines. In particular, the print head is at an angle to the raster lines for the build object. Therefore, each jet is aligned with and, thus, dispenses on a different raster line. In the illustrated embodiment, there are 28 raster lines between jet 1 and jet 5, as represented by bracket 40. Also, there are 4 raster lines between individual jets (e.g., jet 1 and jet 2), as represented by bracket 42. To fill in the 28 raster lines, the print head makes four passes using jets 1, 2, 3, and 4. In the four passes, the first 16 raster lines are covered, as represented by bracket 44. Then, the print head makes four more passes, and uses jets 1, 2, and 3 (without using jet 4) to cover the remaining 12 raster lines of the 28 raster lines, as represented by bracket 46. One advantage of using fewer than all jets in each group on all passes is to reduce non-uniformity in deposition. For example, it is not useful to deposit on a raster line of one layer more than once. Note that, although the 28 raster lines are covered, material is not necessarily dispensed on all 28 raster lines. Thus, the print head moves in one X-direction, covering particular raster lines, shifts in the Y-direction without printing, and then returns in the opposite X-direction, covering the remaining raster lines.

Therefore, with 8 passes, all raster lines are covered as follows: 1) all four jets in each group are scanned to cover raster lines 1+n*28, 2+n*28, 3+n*28, and 4+n*28, 2) the first three jets in each group are scanned to cover 5+n*28, 6+n*28, 7+n*28, and 8+n*28. Thus, note that several raster lines are covered in one pass by different jets. For example, raster line 1 is covered by jet 1 at the same time that raster line 5 is covered by jet 2, raster line 9 is covered by jet 3, raster line 13 is covered by jet 4, and raster line 29 is covered by jet 5.

Randomization

The preferred embodiment of the invention provides randomization, full or partial. Randomization refers to randomizing which jet is to cover a raster line. In a preferred embodiment, randomization may be effectively achieved by employing an algorithm or predefined scheme for assigned jets to raster lines in a seemingly random (or at least varying) manner from layer to layer.

Figure 5:
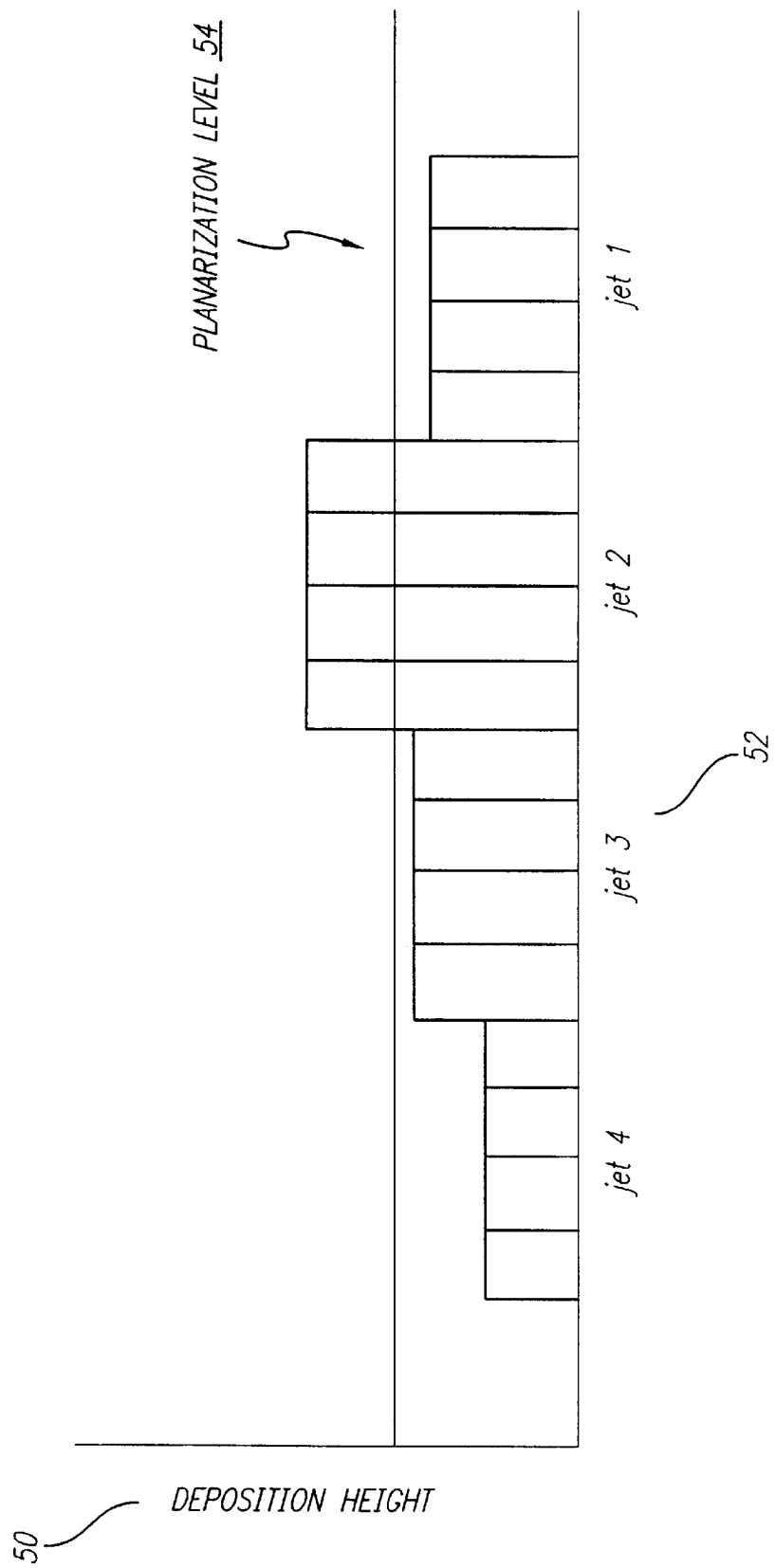
FIG. 5 illustrates a graph of deposition height versus jets.

As a result of the inherent physical and electrical properties of the jet components, each jet in the head 32 may not deposit the same amount of material as other jets in the head 32. FIG. 5 illustrates a graph representing an example of a deposition profile, by deposition height 50 versus jets 52. For example, jet 2 deposited more material on the raster lines that it covered for one level than any other jet represented in the graph. On the other hand, jet 4 deposited less material on the raster lines that it covered for one level than any other jet represented in the graph. When the rolling cylinder of the planarizer rolls over the deposited material at the planarization line 54, the deposition height of the material deposited by jet 2 is decreased. That is, planarization may chop off the "peaks", but not fill in the "valleys". However, there is still a large "valley" left with reference to the deposition height of material deposited by jet 4, which leads to a large difference in the deposition heights of materials deposited by jets 2 and 4. If jet 4 prints on the same four raster lines on each layer, and the deposition height of material deposited by jet 4 is 75% that of the deposition height of material deposited by jet 2, then the deposition height per layer is less at raster lines covered by jet 4. As layers are built up, the difference in deposition height could lead to an inaccurate representation of an object, weakness in the object at the raster lines covered by jet 4, or other problems.

Thus, with randomization, one jet covers different raster lines on each layer. For example, if jet four covered raster line r on layer one and raster line (r+116) on layer two, and if jet 2 covered raster line r on layer one and raster line (r+116) on layer 2, then the deposition height of these raster lines will average out with the deposition heights of other raster lines. That is, randomization will effectively normalize the difference in drop volumes of different jets. This is especially useful if one or more of the 352 jets fail. Failure of one of the jets may be difficult to detect and correct, and so normalization is important.

Randomization could be over the full print head ("full head randomization") or over a part of the print head ("partial head randomization"). That is, all of the jets on the print head could be randomized, or only some could be randomized. In full head randomization, any jet can print on any raster line for some layer. In partial head randomization, there is randomization between select numbers of jets. For example, with ½ head randomization, any jet in the first half of the print head could print on the first raster line. With ½ head randomization, the jets ¼ away (on either side) from the center raster line can print on the center raster line. Partial head randomization could be any portion (e.g., ½, 1/4, etc.). In a preferred embodiment of the invention, 48 jets are randomized (i.e., there is 1/7 randomization).

In some cases, partial head randomization is advantageous over full head randomization in that partial head randomization minimizes the Y-direction movement of the build platform 20 to align different jets with a given raster. In particular, with full head randomization, if an object to be built is 10 inches long in the Y-direction, then to align the first jet with the last raster line on the build platform 20 (or the last jet with the first raster line on the build platform 20) would require moving the build platform 20 approximately 17.5 inches in the Y-direction.

In a preferred embodiment of the invention, the drop volume of each jet is adjusted so that there is a uniform drop size. That is a waveform is used to provide voltage that provides uniformity of drop volume. In particular, a different voltage may be used for each group of jets so that each group of jets has the save average drop volume. Even if jet drop volume is uniform, if one of the jets fails, the problem of having differences in deposition heights for different raster lines still exists and is resolved by randomization.

Also, in preferred embodiments, the group size falls within a range, such as from 0.5–2 times the randomization size, or ⅓–3 times the randomization size, or ⅔–1.5 the randomization size. In one preferred embodiment, the level of randomization is 2 times the group size.

Printing of Each Raster Line

Figure 6:
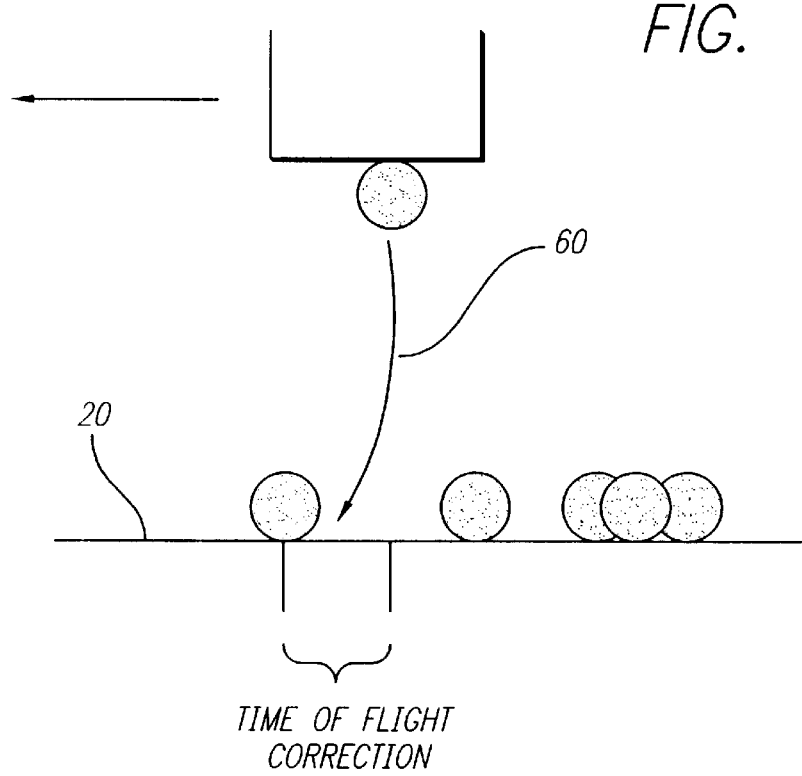
FIG. 6 illustrates an example of drops falling from a moving print head.
Figure 7:
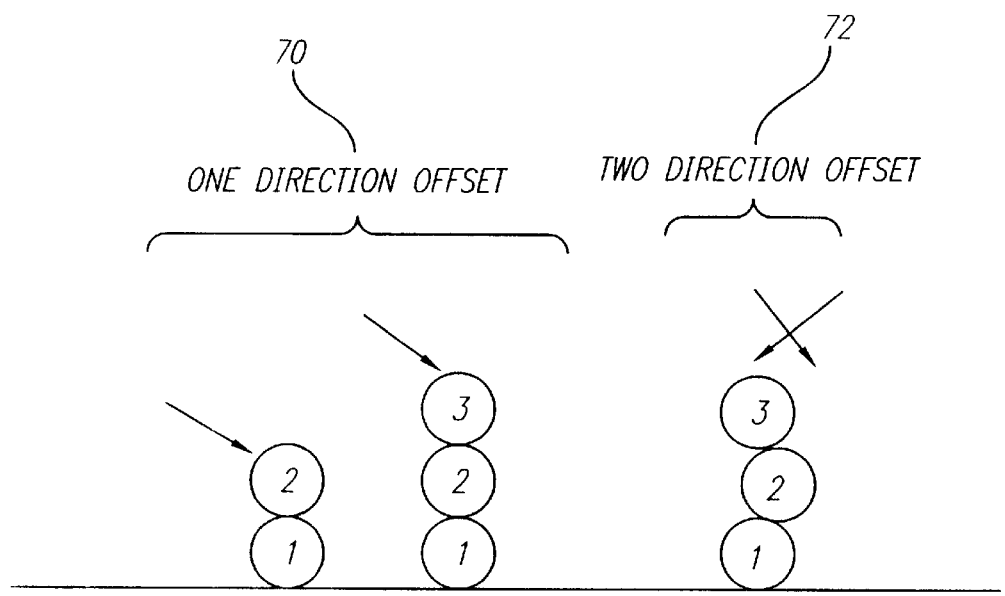
FIG. 7 illustrates an example of drops falling with a one direction offset versus a two direction offset.

In preferred embodiments, each raster line is printed in the same direction on each layer as opposed to printing in opposite directions. Thus, raster line 1 is covered, for example, in the positive X-direction on each layer, while raster line 3 is covered, for example, in the negative X-direction on each layer, and so forth. As the head is moved in the X-direction along raster lines, the jets are selectively fired, and, for each jet firing, a drop of solidifiable material is ejected straight down from the moving print head. However, due to the X-direction motion of the head during jet firing, the drops actually fall at a slight curve 60, as illustrated in FIG. 6, and so the drops land on the build platform 20 slightly off from the X-point from which they were dropped. Due to this phenomena, it is necessary to take into account the flight time of each drop (i.e., time of flight correction). By printing in the same direction, as long as the drop volume from a particular jet remains about the same, the time of flight remains about the same and the drop placement in the X-direction remains about the same. Moreover, if all layers are jetted in the same direction, the drops at each pixel will be offset in only one direction and stack better than if offset in two directions. FIG. 7 illustrates an example of drops falling with a one direction offset versus a two direction offset. The drops with a one direction offset, represented by the numeral 70, stack better than the drops with a two direction offset, represented by numeral 72.

Interlaced Raster Line Deposition and Changing Deposition Order Between Layers The preferred embodiment of the present invention uses interlaced raster line deposition and changes the deposition order between layers.

Several layers of an object are formed over a set of 28 raster lines. For each layer, it can be illustrate the raster line, the jet number covering the raster line, the sequence (i.e., pass) in which that jet covers that raster line (note that 8 passes cover 28 raster lines for a single layer), and the direction in which the print head is moving at the time of deposition.

For example, the "Raster Randomized" value is 140 and indicates that randomization is over 140 jets (i.e., one jet will draw 140 raster lines, with a different raster line selected in each of 140 layers). The "Raster Increment" value is 116 and indicates that raster lines are selected, on a layer by layer basis, by modifying by 116. For example, jet 1 will print on raster line 1 for layer 1; jet 1 will print on raster line ((1*116)–140) on layer 2; then, jet 1 will print on raster line ((2*116)–140) for layer 3, etc. The "Rasters per jet group" value is 28 and indicates that one jet group (having four jets) covers 28 raster lines. The "Number of Jet Groups Randomized" value is 5 and indicates that every 5 jet groups are randomized (e.g., 140/28).

Each raster line is always printed in one direction only. In particular, the following raster lines are printed as the print head moves to the right: 1, 2, 5, 6, 9, 10, 13, 14, 17, 18, 21, 22, 23, and 26. The following raster lines are printed as the print head moves to the left: 3, 4, 7, 8, 11, 12, 15, 16, 19, 20, 23, 24, 27, and 28.

The "Jet sequence for 2 layers" for example is: 1, 3, 5, 7, 2, 4, 6, 8, 8, 6, 4, 2, 7, 5, 3, and 1. Each jet covers 8 raster lines for each layer with 8 passes. Therefore, for one layer, a jet covers raster lines using the raster line sequence 1, 3, 5, 7, 2, 4, 6, and 8, and for another layer, the same jet covers raster lines using the raster line sequence 8, 6, 4, 2, 7, 5, 3, and 1. The following Table-Layer 1 illustrates how the raster line sequence relates to the raster lines covered:

TABLE

| Layer 1 | | | | | | | | |
| --- | --- | --- | --- | --- | --- | --- | --- | --- |
| Raster Line Sequence | 1 | 3 | 5 | 7 | 2 | 4 | 6 | 8 |
| Raster Line Covered | 1 | 3 | 17 | 19 | 2 | 4 | 18 | 20 |

The print head makes 8 passes, shown in the table above as numbered from 1–8, and thus, each jet makes 8 passes over the build platform. The raster line sequence for the first layer is 1, 3, 5, 7, 2, 4, 6, 8. The raster line is 1 for raster line sequence 1. The raster line is 3 for raster line sequence 3. The raster line is 17 for raster line sequence 5. The other raster lines can be determined similarly using the values of column 80. Thus, for the eight passes made for layer 1, jet 1 covers raster lines 1, 2, 3, 4, 17, 18, 19, and 20.

In particular, for layer 1, in the first pass, jet I covers raster line 1, jet 2 covers raster line 5, jet 3 covers raster line 9, and jet 4 covers raster line 13. The build platform is shifted in the Y-direction without dispensing material, and then, the print head moves across the build platform in the reverse X-direction, while dispensing material. This reverse X-direction movement is the second pass.

In the second pass, jet 1 covers raster line 3, jet 2 covers raster line 7, jet 3 covers raster line 11, and jet 4 covers raster line 15. In the third pass, jet 1 covers raster line 17, jet 2 covers raster line 21, and jet 3 covers raster line 25. In the fourth pass, jet 1 covers raster line 19, jet 2 covers raster line 23, and jet 3 covers raster line 27. In the fifth pass, jet 1 covers raster line 2, jet 2 covers raster line 6, jet 3 covers raster line 10, and jet 4 covers raster line 14. In the sixth pass, jet 1 covers raster line 4, jet 2 covers raster line 8, jet 3 covers raster line 12, and jet 4 covers raster line 16. In the seventh pass, jet 1 covers raster line 18, jet 2 covers raster line 22, and jet 3 covers raster line 26. In the eighth pass, jet 1 covers raster line 20, jet 2 covers raster line 24, and jet 3 covers raster line 28.

Thus, for the first layer, jets 1, 2, 3, and 4, are used to cover 28 raster lines. The fact that raster line 3 may be printed before raster line 2 is the concept of interlacing raster line deposition.

For layer 2, the deposition order is reversed. Due to the partial randomization, jets 17–20 cover the raster lines for layer 2, which were covered by jets 1–8 in layer 1.

The following Table-Layer 2 illustrates how the sequence relates to the raster lines covered:

TABLE

| Layer 2 | | | | | | | | |
| --- | --- | --- | --- | --- | --- | --- | --- | --- |
| Raster Line Sequence | 8 | 6 | 4 | 2 | 7 | 5 | 3 | 1 |
| Raster Line Covered | 24 | 22 | 8 | 6 | 23 | 21 | 7 | 5 |

The raster line sequence for the second layer is 8, 6, 4, 2, 7, 5, 3, 1. As illustrated in FIG. 8A, by column 82, the raster line is 24 for raster line sequence 8. The raster line is 22 for raster line sequence 6. The raster line is 8 for raster line sequence 4. The other raster lines can be determined similarly using the values of column 82. Thus, for the eight passes made for layer 2, jet 19 covers raster lines 5, 6, 7, 8, 21, 22, 23, and 24. The remaining layers are built in a similar manner.

Conclusion

While embodiments and applications of this invention have been shown and described, it should be apparent to those skilled in the art that many more modifications are possible without departing from the inventive concepts herein. The invention, therefore, is not to be restricted, except in the spirit of the appended claims.

What is claimed is:

1. A method of creating a three-dimensional object by depositing build material in multiple layers from a plurality of orifices in a print head in a rapid prototyping system, the method comprising the steps of:

selecting a different number of orifices in a jet group from which material is deposited onto a platform to create the three-dimensional object for each of multiple passes in a main scanning direction over the platform, each pass aligning the selected orifices with corresponding raster line positions;

energizing the print head to fire orifices according to a bit map having a grid of cells corresponding to pixels in rows and columns on the platform on which the three-dimensional object is built, adjacent rows of pixels being offset in the main scanning direction by a fractional amount of spacing between pixels in the main scanning direction so that center points of pixels in adjacent rows do not align; and depositing material along corresponding raster lines onto the platform from the selected orifices during each of the passes, each orifice dispensing material on a different raster line.

2. The method of claim 1, wherein the rapid prototyping system is a selective deposition modeling system.

3. The method of claim 1, wherein the orifices are organized in groups and wherein the step of selecting further comprises the step of selecting a different number of orifices in each group.

4. The method of claim 1, further comprising the steps of:

selecting a portion of orifices from which material is deposited onto a platform to create the three-dimensional object to be randomized; and for each of multiple layers of the three-dimensional object, aligning each orifice with a different raster line from the previous layer.

5. The method of claim 4, wherein the randomization is partial.

6. The method of claim 4, further comprising the step of controlling a volume of the material deposited from each orifice to ensure a uniform amount of material is deposited from each orifice.

7. The method of claim 1, further comprising the step of covering each raster line in one direction, wherein one raster line is covered in a different direction.

8. The method of claim 1, further comprising the step of performing interlaced raster line deposition.

9. The method of claim 1, further comprising the step of changing deposition order between layers of the three-dimensional object.

10. A rapid prototyping system utilizing a print head with a plurality of orifices to dispense build material in multiple layers to create a three-dimensional object, comprising:

means for selecting a different number of orifices from which material is deposited onto a platform to create the three-dimensional object;

means for energizing the print head to fire orifices according to a bit map having a grid of cells corresponding to pixels in rows and columns on the platform on which the three-dimensional object is built, adjacent rows of pixels being offset in the main scanning direction by a fractional amount of spacing between pixels in the main scanning direction so that center points of pixels in adjacent rows do not align; and means for depositing material in multiple passes in a main scanning direction onto the platform from the selected orifices, each pass aligning the selected orifices with corresponding raster line positions such that each orifice dispenses material on a different raster line; and means for positioning the print head at an angle to the raster lines for the three dimensional build object.

11. The apparatus of claim 10, wherein the rapid prototyping system is a selective deposition modeling system.

12. The apparatus of claim 10, wherein the orifices are organized in groups and wherein the means for selecting further comprises the means for selecting a different number of orifices in each group.

13. The apparatus of claim 10, further comprising:

means for selecting a portion of orifices from which material is deposited onto a platform to create the three-dimensional object to be randomized; and means for aligning each orifice with a different raster line from the previous layer each of multiple layers of the three-dimensional object.

14. The apparatus of claim 13, wherein the means for selecting the portion of orifices from which material is deposited onto a platform to create the three-dimensional object selects in a partially random manner.

15. The apparatus of claim 13, further comprising means for controlling a volume of the material deposited from each orifice to ensure a uniform amount of material is deposited from each orifice.

16. The apparatus of claim 10, further comprising the means for covering each raster line in one direction, wherein one raster line is covered in a different direction.

17. The apparatus of claim 10, further comprising the means for performing interlaced raster line deposition.

18. The apparatus of claim 10, further comprising the means for changing deposition order between layers of the three-dimensional object.

19. The apparatus of claim 10 wherein the print head shifts in a secondary scanning direction without dispensing material after completing each pass in the primary scanning direction.

20. The method of claim 1 further comprising shifting the print head in a secondary scanning direction without dispensing material after completing each pass in the primary scanning direction.

21. The apparatus of claim 19 wherein a plurality of print heads are used to dispense the material.

22. The apparatus of claim 21 wherein the print heads are positioned end to end in the secondary scanning direction or back to back in the primary scanning direction.

23. The method of claim 20 further comprising using a plurality of print heads to dispense the material.

24. The method of claim 23 further comprising positioning the print heads end to end in the secondary scanning direction or back to back in the primary scanning direction.

25. The method of claim 1 further comprising positioning the print head at an angle to the raster lines for the three-dimensional object.

26. The apparatus of claim 10 wherein the print head is positioned at an angle to the raster lines for the three-dimensional object.

27. The method of claim 1, wherein the center points of pixels in adjacent rows do not align within layers.

28. The method of claim 1, wherein the center points of pixels in adjacent rows do not align between layers.

29. The apparatus of claim 10, wherein the center points of pixels in adjacent rows do not align within layers.

30. The apparatus of claim 10, wherein the center points of pixels in adjacent rows do not align between layers.

* * * * *

UNITED STATES PATENT AND TRADEMARK OFFICE
CERTIFICATE OF CORRECTION

PATENT NO. : 6,136,252  
DATED : October 24, 2000  
INVENTOR(S) : Bedal et al.

Page 1 of 1

It is certified that error appears in the above-identified patent and that said Letters Patent is hereby corrected as shown below:

Title page,  
Should have included the following:  
-- Related U.S. Application Data  
Continuation-in-part of Ser. No. 08/722,335, Sep. 27, 1996, now abandoned; which is a continuation-in-part of Ser. No. 08/534,813, Sep. 27, 1995, now abandoned. --

Column 1,  
Lines 6-11, should read as follows:  
-- This is a continuation-in-part of U.S. Pat. Application Ser. No. 08/722,335, filed Sep. 27, 1995, now abandoned, which is a continuation-in-part of U.S. Pat. Application Ser. No. 08/534,813, filed on Sep. 27, 1995, now abandoned. --

Signed and Sealed this

First Day of January, 2002

*Attest:*

*Attesting Officer*

JAMES E. ROGAN  
*Director of the United States Patent and Trademark Office*

UNITED STATES PATENT AND TRADEMARK OFFICE
CERTIFICATE OF CORRECTION

PATENT NO.    : 6,136,252
DATED         : October 24, 2000
INVENTOR(S)   : Bedal et al.

It is certified that error appears in the above-identified patent and that said Letters Patent is hereby corrected as shown below:

Title page, Item 54 and Column 1, lines 1-3,
Item [54], Title, "APPARATUS FOR ELECTRO-CHEMICAL DEPOSITION WITH THERMAL ANNEAL CHAMBER" should read -- METHOD AND APPARATUS FOR PRINTING RASTER LINES IN A SELECTIVE DEPOSITION MODELING SYSTEM --.

Column 3,
Line 62, "two direction offset and" should read -- two direction offset. --

Signed and Sealed this

Thirteenth Day of August, 2002

*Attest:*

*Attesting Officer*

JAMES E. ROGAN
*Director of the United States Patent and Trademark Office*